Dec. 20, 1960 S. W. LEWINTER 2,965,770
LINEAR WAVE GENERATOR
Filed March 29, 1957
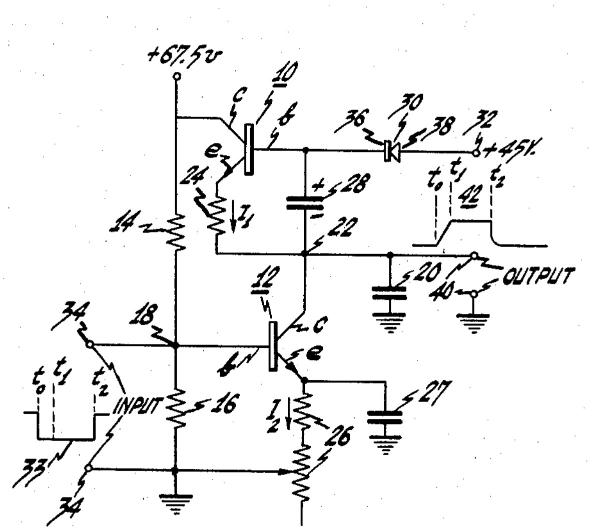
INVENTOR.
SIDNEY W. LEWINTER
BY J. L. Whittaker
ATTORNEY

United States Patent Office 2,965,770

Patented Dec. 20, 1960

2,965,770

LINEAR WAVE GENERATOR

Sidney W. Lewinter, Verona, N.J., assignor to Radio Corporation of America, a corporation of Delaware Filed Mar. 29, 1957, Ser. No. 649,369

2 Claims. (Cl. 307—88.5)

The present invention relates to an improved linear wave generator which, while not restricted thereto, is particularly useful in connection with timing measurements.

An object of this invention is to provide an improved generator for producing a highly linear wave.

Another object of the invention is to provide an improved linear wave generator which is light in weight and therefore especially suitable for use in airborne equipments such as radar altimeters, for example.

Another object of the invention is to provide an improved linear wave generator which requires no vacuum tubes.

A preferred form of this invention includes a transistor in series with a charge storage means and a switch effectively connected across the storage means. (The switch may be a second transistor.) Upon closing the switch, the storage means discharges through the switch, and upon opening the switch, the storage means charges through the transistor. A circuit connected to the transistor and responsive to the opening of the switch, causes the transistor to conduct constant current during its charging interval, whereby the storage means must charge linearly.

The constant current producing circuit utilizes the emitter-follower characteristics of the transistor. This circuit includes a second storage means effectively connected across the transistor base-to-emitter circuit. When the switch is opened, the second storage means acts like a substantially constant voltage source, the emitter assumes substantially the same voltage as the base, and the transistor conducts constant emitter-to-collector current.

The invention will be described in greater detail by reference to the following description taken in connection with the accompanying drawing, the single figure of which is a schematic circuit diagram of a preferred embodiment of the invention.

Referring to the drawing, transistor 10 and switch 12 (a second transistor) are connected in series. The high side of a resistor voltage divider 14, 16 is connected to the collector of the first transistor 10, and point 18 on the divider is connected to the base of the switch transistor 12. In a typical circuit, the B+ voltage connected to the high side of the divider may be 67½ volts, as shown, and the values of the resistors may be such that the base of switch transistor 12 is normally maintained at a voltage of about 12 volts. With the circuit so connected, transistors 10 and 12 both conduct.

Charge storage means 20, shown as a condenser, is effectively connected across the emitter-to-collector circuit of the second transistor 12. During conduction of transistors 10 and 12, condenser 20 is clamped to the voltage developed at point 22 of the circuit (which is connected to the collector of the second transistor 12), and charges to a given quiescent level. This charge is only a fraction of the charge condenser 20 is capable of assuming.

In more detail, the quiescent level to which condenser 20 is clamped, may be determined as follows. As mentioned above, the base of switch transistor 12 is connected to a fixed voltage point 18. Due to emitter-follower action, the emitter of switch transistor 12 is forced to assume a voltage nearly equal to that at point 18. This establishes the value of current $I_2$ through resistor 26. The nature of the circuit is such that the current $I_1$ through resistor 24 is substantially equal to $I_2$. Also, due to emitter-follower action, the emitter of transistor 10 is at substantially 45 volts (the base voltage of transistor 10). The values of $I_1$ and $I_2$, and the emitter voltage of transistor 10 determine the voltage at point 22, that is, the quiescent voltage level to which condenser 20 is clamped.

Condenser 28 is connected in the base-to-emitter circuit of transistor 10. Forty-five volts is applied to one terminal of this condenser through diode 30, so that the condenser charges in the polarity indicated. The charging circuit includes terminal 32, diode 30, condenser 28, and the parallel path including in one leg condenser 20 and in the other leg transistor 12 and condenser 27. In a typical circuit, condenser 27 is many times larger than condenser 20 so that it carries substantially the entire charging current of condenser 28, when switch transistor 12 conducts.

In operation, a negative-going gate pulse 33 is applied to input terminals 34. These terminals are connected between the base and emitter of the switch transistor 12. The pulse is sufficiently negative to drive switch transistor 12 beyond cutoff. When the switch transistor 12 is cut off, storage condenser 20 charges through transistor 10. Also, since the major part of the charging path of condenser 28 is now open, this condenser attempts to discharge in the circuit including the base and emitter of transistor 10 and resistor 24.

The 45 volt source connected to terminal 32 is of low impedance and, if not disconnected, would complete a second charging circuit for condenser 20, thereby adversely affecting the linearity of wave 42. However, when switch transistor 12 is cut off, condenser 20 begins to charge through transistor 10 in a sense to drive point 22 more positive. As will be explained below, condenser 28 does not discharge appreciably during this interval, whereby the voltage drop across this condenser remains substantially constant. Accordingly, when the condenser 28 terminal connected to point 22 rises, the condenser 28 terminal connected to cathode 36 of diode 30 rises with it. The diode cathode 36 therefore becomes more positive than diode anode 38, and the diode is cut off. This effectively disconnects the 45 volt source from condenser 28.

Condenser 28 is of substantially larger value than condenser 20. The time constant of condenser 28, resistor 24 and the base-to-emitter impedance of transistor 10 is extremely high. This is due in largest part to the emitter-follower action of transistor 10, which produces a high impedance, looking into the transistor base circuit. Condenser 28 looks to the transistor base circuit like a constant voltage source (with respect to point 22) as the condenser does not appreciably discharge through the transistor. By virtue of emitter-follower action then, the current drawn by the collector-emitter circuit, which is substantially equal to the current passing through resistor 24, is constant. By the same token, the voltage drop across resistor 24 is substantially equal to the voltage across condenser 28. Looked at in another way, since the emitter-to-collector current of the transistor is constant, its base-to-emitter current (the extremely small amount of current discharged by condenser 28) is substantially constant. Accordingly, condenser 20, which charges through the emitter-to-collector circuit of transistor 10, must charge in a linear fashion.

The output wave form available at terminals 40 is shown at 42. The portion of the wave from $t_0$ to $t_1$ is substantially linear. The amplitude of this portion of the wave is approximately equal to the quiescent voltage drop from the collector to the emitter of transistor 10 (about 22½ volts in the circuit shown). At point in time $t_1$, the emitter voltage of transistor 10 reaches approximately the same value as the collector voltage and the transistor therefore no longer conducts current in its collector-to-emitter circuit. Thus, during the period $t_1$–$t_2$ condenser 20 remains charged to a substantially constant value.

A typical circuit designed for a pulse altimeter includes components of the following values:

| | |
|---|---|
| Resistor **14** | 47,000 ohms. |
| Resistor **16** | 10,000 ohms. |
| Resistor **24** | 10,000 ohms. |
| Resistor **26** | 3900 ohms+1000 ohm potentiometer. |
| Condenser **20** | 270 micromicrofarads. |
| Condenser **28** | 0.02 microfarad. |
| Condenser **28** | 4700 micromicrofarads. |

The transistors are NPN type, however, PNP or other types may be used instead, as is understood by those skilled in the art. Also, the transistors are high $\beta$ transistors.

With the circuit above, the linear portion of wave 42 is about 2 to 2½ microseconds in duration.

What is claimed is:

1. A linear wave generator comprising, in combination, a pair of transistors, each having a base, emitter and collector, said transistors being connected with their collector-to-emitter circuits in series; connections for a source of direct potential connected across the series circuit of said two transistors in a senee to produce current flow in the series circuit; a connection for applying a fixed voltage to the base of one of said transistors, a resistor in the emitter circuit of said one transistor whereby due to emitter-follower action the emitter assumes a voltage nearly equal to said fixed voltage, charge storage means connected in shunt with the collector-to-emitter circuit of said one transistor; means connected to said one transistor for driving the same beyond cutoff, whereby said storage means charges through the emitter-to-collector circuit of the other transistor; and means coupled between the base and emitter of said other transistor for applying substantially constant current flow in said circuit during the charging of said storage means.

2. A linear wave generator comprising, in combination, a pair of transitors, each having a base, emitter and collector, said transistors being connected with their collector-to-emitter circuits in series; connections for a source of direct potential connected across the series circuit of said two transistors in a sense to produce current flow in the series circuit; a connection for applying a fixed voltage to the base of one of said transistors, a resistor in the emitter circuit of said one transistor whereby due to emitter-follower action the emitter assumes a voltage nearly equal to said fixed voltage, a capacitor connected across said resistor, charge storage means connected in shunt with the collector-to-emitter circuit of said one transistor; means connected to said one transistor for driving the same beyond cutoff, whereby said storage means charges through the emitter-to-collector circuit of the other transistor; a storage condenser capable of storing a charge substantially larger than the charge which can be stored in the charge storage means connected across the base-to-emitter circuit of said other transistor for applying a substantially constant voltage to said circuit during the charging of said charge storage means, and a charging circuit for said storage condenser, said charging circuit comprising a diode having its cathode connected to the base of said other transistor and its anode connected to a connection for a positive voltage of less magnitude than that to which said charge storage means is to be charged.

References Cited in the file of this patent

UNITED STATES PATENTS

| | | |
|---|---|---|
| 2,554,172 | Custin | May 22, 1951 |
| 2,595,208 | Bangert | Apr. 29, 1952 |
| 2,606,287 | McCoy | Aug. 5, 1952 |
| 2,663,800 | Herzog | Dec. 22, 1953 |
| 2,735,011 | Dickinson | Feb. 14, 1956 |
| 2,827,568 | Altschul | Mar. 18, 1958 |
| 2,835,809 | Taylor | May 20, 1958 |